3,138,502
SOLID PROPELLANT FUEL BINDER
Claude J. Barr, Herrin, and Harold R. Weisbrod, Marion,
Ill., assignors to Olin Mathieson Chemical Corporation,
a corporation of Virginia
No Drawing. Filed Mar. 13, 1958, Ser. No. 721,320
1 Claim. (Cl. 149—109)

This invention relates to a composition of matter which is suitable for use as a binder in solid propellant compositions.

It is well known in the art to prepare solid propellant compositions. They are conventionally prepared by forming into suitable shapes or grains, as by molding or extrusion, an intimate mixture which contains a solid fuel and a solid oxidizer. The art is aware that such shapes must have certain characteristics, in order that they will perform satisfactorily. Thus, they must be able to withstand the pressure developed during burning (of the order of approximately 1000 p.s.i.a. or 2000 p.s.i.a.) in order that they will burn evenly. Additionally, the shapes should be free from mechanical flaws and homogeneous, so that they will burn at approximately the same rate over all exposed surfaces as long as the pressure during burning is constant. Furthermore, the shapes must be sufficiently strong that stresses due to non-uniform pressures developed during burning or to vibrations or shocks will not cause them to crack or shatter prior to or during the burning. Shapes or grains having the aforementioned desired characteristics are generally prepared by first forming an intimate admixture of the fuel and oxidizer and additionally a binder, and then forming the mixture into the desired shape or grain.

In accordance with the present invention, there is provided a composition of matter which is particularly adapted for use in preparing solid propellant compositions which, when shaped, have proper handling and burning characteristics. This binder consists essentially of three ingredients. The first of these ingredints is polyisobutylene which has an average molecular weight within the range from about 81,000 to about 99,000, as measured by the Staudinger method. The binder is composed of from about 40 percent by weight to about 80 percent by weight of this type of polyisobutylene. The second ingredient of the binder is asphalt, preferably petroleum asphalt, which has a penetration (ASTM D5–25) of from about 16 to about 21-tenths of a millimeter using a 100-gram load at 77° F. The binder will contain from about 30 to about 10 percent by weight of the asphalt. The third ingredient is di-n-octyl sebacate and this will amount to from about 30 to about 10 percent by weight of the binder composition.

The following examples illustrate various embodiments which fall within the scope of this invention.

EXAMPLE I

Three grams of polyisobutylene having an average molecular weight of about 90,000 as determined by the Staudinger method, were added to 10 cc. of petroleum ether, and the polyisobutylene was allowed to swell overnight. The polyisobutylene-petroleum ether mixture was then placed in a mixer, and one gram of petroleum asphalt which has a penetration (ASTM D5–25) of 18-tenths of a millimeter using a 100-gram load at 77° F., one gram of di-n-octl sebacate and 10 cc. of petroleum ether were added. The entire mixture was then intimately admixed for a period of 20 minutes while the mixture was maintained at a temperature of about 20° C. to 25° C. in order to prevent undue temperature rise and loss of petroleum ether. Four grams of finely divided boron were then added to the mixture and mixing was continued for an additional 10 minutes. 31 grams of finely divided ammonium perchlorate were then added while mixing was continued, the ammonium perchlorate being added in four increments with 5 minutes of mixing between the addition of each increment. After the last ammonium perchlorate addition, the temperature of the mixture was permitted to increase to 55° C., and after 20 minutes of mixing at 55° C. the mixing was stopped. A high vacuum was then applied to the mixture for a period of 10 minutes with intermittent operation of the mixer in order to remove the petroleum ether.

After this addition had been done, the mixture was removed from the mixer and placed in an extrusion mold. The mixture was then extruded into ⅛ inch diameter strands at an extrusion pressure of 15,000 p.s.i. and at a temperature of 50° C. The test grains thus formed were then placed in a miniature rocket motor which was mounted on the periphery of a wheel-type specific impulse test unit. By firing the grains it was found that they had a specific impulse of 243.9 seconds. Table I sets forth typical information concerning Example I as well as Examples II through VI which were performed in a similar manner.

Table I

| Example | Fuel | $NH_4ClO_4$, gm. | Polyisobutylene, gm. | Asphalt, gm. | $DOS^2$, gm. | Spec. Imp. |
|---|---|---|---|---|---|---|
| I | 4 gm. B | 31 | 3.0 | 1.0 | 1.0 | 243.9 |
| II | 3.6 gm. B 0.4 gm. Mg | 30 | 3.6 | 1.2 | 1.2 | 236.7 |
| III | 1.2 gm. Mg | 33 | 3.6 | 1.2 | 1.2 | 232.0 |
| IV | 1.2 gm. $MgB_4$ | 33 | 3.6 | 1.2 | 1.2 | 227.7 |
| V | 3.6 gm. Al | 30 | 3.6 | 1.2 | 1.2 | 229.8 |
| VI | 3.0 gm. $DMA^1$ | 30 | 4.4 | 1.5 | 1.5 | |

[1] Decaborane-morpholine adduct (1:2) prepared as described in Mann et al. application Serial No. 532,744, filed September 6, 1955.
[2] Di-n-octyl sebacate.

As those skilled in the art will understand, the binder of the present invention is useful in conjunction with a wide variety of salts other than ammonium perchlorate, for example, lithium perchlorate, sodium perchlorate, potassium perchlorate, ammonium nitrate and the like. Generally speaking, when the binder of the present invention is employed for the purpose of preparing solid propellant shapes or grains, such shapes or grains will generally contain from about 5 to about 30 percent by weight of the fuel, from about 15 to about 30 percent by weight of the binder and from about 80 to about 40 percent by weight of the oxidizer.

What is claimed is:

A composition of matter suitable for use as a binder in solid propellant compositions consisting essentially of from about 40 percent to about 80 percent by weight of polyisobutylene, having an average molecular weight within the range from about 81,000 to about 99,000 as measured by the Staudinger method, from about 30 percent to about 10 percent by weight of petroleum asphalt having a penetration (ASTM D5–25) of from about 16- to about 21-tenths of a millimeter using a 100-gram load at 77° F., and about 30 percent to about 10 percent by weight of di-n-octyl sebacate.

References Cited in the file of this patent

UNITED STATES PATENTS

| | | |
|---|---|---|
| 2,485,625 | Merley et al. | Oct. 25, 1949 |
| 2,563,265 | Parsons | Aug. 7, 1951 |
| 2,740,702 | Mace | Apr. 3, 1956 |
| 2,857,258 | Thomas | Oct. 21, 1958 |

OTHER REFERENCES

Buttrey: Plasticizers, Cleaver Hume Press Co., New York, pp. 77–78, 1947.